(12) United States Patent
Bates et al.

(10) Patent No.: US 7,489,465 B2
(45) Date of Patent: Feb. 10, 2009

(54) APPARATUS, SYSTEM, AND METHOD FOR TIMING BASED SERVO TAPE FORMATING

(75) Inventors: Allen Keith Bates, Tucson, AZ (US); Nhan Xuan Bui, Tucson, AZ (US); Robert Allen Hutchins, Tucson, AZ (US); Mark Allan Taylor, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 72 days.

(21) Appl. No.: 11/624,538

(22) Filed: Jan. 18, 2007

(65) Prior Publication Data

US 2008/0174897 A1    Jul. 24, 2008

(51) Int. Cl.
*G11B 21/12* (2006.01)
(52) U.S. Cl. .................................................. 360/75
(58) Field of Classification Search ................ None
See application file for complete search history.

(56) References Cited

U.S. PATENT DOCUMENTS

| | | | |
|---|---|---|---|
| 5,689,384 A * | 11/1997 | Albrecht et al. | 360/77.12 |
| 6,522,490 B1 | 2/2003 | Cates et al. | 360/48 |
| 6,532,128 B1 * | 3/2003 | Bui et al. | 360/74.1 |
| 6,879,457 B2 * | 4/2005 | Eaton et al. | 360/75 |
| 7,289,289 B2 * | 10/2007 | Hoerger et al. | 360/75 |
| 7,333,291 B1 * | 2/2008 | Fasen | 360/77.12 |
| 2005/0219734 A1 | 10/2005 | Rothermel et al. | 360/75 |
| 2005/0254163 A1 | 11/2005 | Nakao | 360/77.12 |

* cited by examiner

*Primary Examiner*—Hoa T Nguyen
*Assistant Examiner*—James L. Habermehl
(74) *Attorney, Agent, or Firm*—Kunzler & McKenzie

(57) ABSTRACT

An apparatus, system, and method are disclosed for formatting a timing-based servo pattern on a magnetic tape. A first write head concurrently writes a base number of stripes to a plurality of first stripe patterns with a first and third element and writes the base number of stripes to a plurality of second stripe patterns with a second and fourth element of a first write head in response to at least one first write signal. A second write head concurrently writes an incremental number of stripes to a specified first stripe pattern to form a first incremental stripe pattern with a fifth write element and writes the incremental number of stripes to a specified second stripe pattern to form a second incremental stripe pattern with a sixth write element.

17 Claims, 11 Drawing Sheets

APPARATUS, SYSTEM, AND METHOD FOR TIMING BASED SERVO TAPE FORMATING

BACKGROUND OF THE INVENTION

1. Field of the Invention

This invention relates to tape formatting and more particularly relates to timing-based servo tape formatting.

2. Description of the Related Art

Magnetic tape provides a means for physically storing data to longitudinal tracks of a magnetic tape moved longitudinally with respect to read and/or write heads. One method for maximizing the amount of data that can be stored is to maximize the number of parallel tracks on the media, and that is typically accomplished by employing servo systems which provide track following and allow the tracks to be spaced very closely. Another method for maximizing the amount of data that can be stored is to maximize the amount of data that can be stored on an individual track, and often the recording and detection arrangements require that the longitudinal movement of the magnetic tape be kept relatively constant in order to maximize the data density of a track. Still another method for maximizing the amount of data that can be stored is to maximize the amount of magnetic tape that can be provided on a reel, for example, by making the magnetic tape thinner. The thin magnetic tape is more sensitive to variations in the longitudinal movement of the tape by a drive system, requiring that the longitudinal movement of the magnetic tape be kept relatively constant in order to avoid stretching of the tape or having slack in the tape.

Timing based servo systems allow both objectives to be attained. A timing based servo system is employed, for example, with the Linear Tape Open (LTO) format, one example comprising the LTO Ultrium magnetic tape drive and associated tape cartridge produced by International Business Machines Corporation (IBM) of Armonk, N.Y. A linear servo track comprises a pattern, for example, of prerecorded magnetic transitions or edges of stripes forming a timing based servo pattern of a repeating cyclic periodic sequence of transitions of two different slants or azimuthal orientations that extend laterally over the linear servo track. For example, the pattern may comprise transitions slanted, or having an azimuthal orientation, in a first direction with respect to the longitudinal direction of the linear servo track, alternating with transitions having different slants, for example, in the opposite direction. Thus, as the magnetic tape is moved with respect to a servo sensor in the longitudinal direction, the lateral positioning of the servo sensor with respect to the timing based servo track is sensed based on a measure of time between two transitions having different slants as compared to time between two transitions having parallel slants. The relative timing of the transitions read by the servo read head varies linearly depending on the lateral position of the head. Herein, the terms "slant", "slanted" or "slants" refer to any azimuthal orientation, including no slant, or a transition that is perpendicular to the longitudinal direction or parallel to the transverse direction.

The lateral position of a servo sensor with respect to the servo track may comprise a measure of time between two transitions having different slants, this distance called the "a" distance, as compared to time between two transitions having the same slant, this distance called the "b" distance. The servo tracks are typically generated by a servo writer having two spaced apart write elements of different slants, forming the "a" distance, which are pulsed simultaneously.

With the servo writer utilizing two spaced apart elements with different slants, the writer generator is pulsed periodically with the period between pulses set so that, with the nominal tape velocity of the servo writer drive, the geometric distance between elements having the same slant (generated by the same element of the writer) is the "b" distance discussed above. Thus substantial error in the velocity of the tape by the servo writer drive or substantial error in the timing between the pulses, results in an error in the "b" distance and hence an error in the lateral position calculated based on the "b" pulse timing.

Further, the longitudinal velocity of the magnetic tape is determined based on measuring the timing between two transitions having the same slant, the "b" distance. Thus substantial error in the velocity of the tape by the servo writer drive or substantial error in the timing between the pulses, results in an error in the "b" distance and hence an error in the longitudinal velocity of the tape calculated based on the "b" pulse timing.

Error in the resultant spacing of the "b" transitions cannot be compensated for in the magnetic tape drive because the error is written into the magnetic tape in the servo pattern.

SUMMARY OF THE INVENTION

From the foregoing discussion, there is a need for an apparatus, system, and method that precisely formats magnetic tape with timing-based servo patterns. Beneficially, such an apparatus, system, and method would reduce read and write errors for data stored on the magnetic tape and support increased read and write speeds.

The present invention has been developed in response to the present state of the art, and in particular, in response to the problems and needs in the art that have not yet been fully solved by the currently available tape formatting methods. Accordingly, the present invention has been developed to provide an apparatus, system, and method for formatting a timing-based servo pattern that overcomes many or all of the above-discussed shortcomings in the art The apparatus to format a timing-based servo pattern on a magnetic tape is provided with a plurality of modules configured to functionally execute the steps of concurrently writing a base number of stripes to a plurality of first stripe patterns and second stripe patterns and concurrently writing an incremental number of stripes to a specified first stripe pattern and a specified second stripe pattern. These modules in the described embodiments include a first write head and a second write head.

The first write head includes at least four write elements. The write elements concurrently write a base number of stripes to a plurality of first stripe patterns on a magnetic tape in response to at least one first write signal. A first and third write element of the first write head concurrently write the base number of stripes to a plurality of first stripe patterns on the magnetic tape and a second and fourth write element concurrently write the base number of stripes to a plurality of second stripe patterns.

The second write head includes at least two write elements. A fifth write element writes an incremental number of stripes to a specified first stripe pattern to form a first incremental stripe pattern and a sixth write element writes an incremental number of stripes to a specified second stripe pattern to form a second incremental stripe pattern. The apparatus formats the magnetic tape with precisely placed stripe patterns that are employed as timing-based servo patterns to position a magnetic head latitudinally relative to the magnetic tape and to control the longitudinal motion of the tape.

In one embodiment, the second write head comprises of a read element configured to detect a stripe written by the first write head. The fifth and sixth write elements may write the incremental number of stripes in response to detecting the written stripe. In another embodiment, the first write head comprises a read element configured to detect a stripe written by the second write head. The first write head may write the base number of stripes to response to detecting the written stripe.

In one embodiment, the first and second write heads write a repeated sequence of the first stripe pattern, the second stripe pattern, the first incremental stripe pattern, and the second incremental stripe pattern. The base number may be four stripes and the incremental number may be one stripe. The write elements of the write heads may be lithographically formed to a specified tolerance of zero point zero one to zero point one micrometers (0.01 to 0.1 μm). The first and second stripe patterns and first incremental and second incremental stripe patterns may be encoded with longitudinal positioning servo codes (LPOS). Each stripe is configured as a substantially rectangular area slanted at an angle to an axis perpendicular to the magnetic tape in the range of one to forty-five degrees (1-45°).

A system of the present invention is also presented to format a timing-based servo pattern. The system comprises a magnetic tape configured to store digital data, a servo write module configured to generate a plurality of first and second write signals, and first and second write heads.

The first write head includes at least four write elements configured to concurrently write a base number of stripes to a plurality of first stripe patterns on the magnetic tape in response to at least one first write signal. The first and third write element concurrently write a base number of stripes to a plurality of first stripe patterns on the magnetic tape and a second and fourth write element concurrently write the base number of stripes to a plurality of second stripe patterns. The second write head includes two write elements. A fifth write element writes an incremental number of stripes to a specified first stripe pattern to form a first incremental stripe pattern and a sixth write element writes the incremental number of stripes to a specified second stripe pattern to form a second incremental stripe pattern.

The second write head may include a read element configured to detect a stripe written by the first write head. The fifth and sixth write elements may write the incremental number of stripes in response to detecting the written stripe. In another embodiment, the first write head comprises a read element configured to detect a stripe written by the second write head. The first write head may write the base number of stripes to response to detecting the written stripe. The system allows the precise placement of stripe patterns for timing-based servo patterns.

A method of the present invention is also presented for formatting a timing-based servo pattern. The method in the disclosed embodiments substantially includes the steps to carry out the functions presented above with respect to the operation of the described apparatus and system. The method includes concurrently writing a base number of stripes to a plurality of first stripe patterns and second stripe patterns and concurrently writing an incremental number of stripes to a specified first stripe pattern and a specified second stripe pattern.

A first write head concurrently writes a base number of stripes to a plurality of first stripe patterns with a first and third element and writes the base number of stripes to a plurality of second stripe patterns with a second and fourth element of a first write head in response to at least one first write signal.

A second write head concurrently writes an incremental number of stripes to a specified first stripe pattern to form a first incremental stripe pattern with a fifth write element of the second write head and writes the incremental number of stripes to a specified second stripe pattern with a sixth write element to form a second incremental stripe pattern.

In one embodiment, a read element on the second write head detects a stripe written by the first write head and the second write head writes the incremental number of stripes in response to detecting the written stripe. A read element on the first write head may detect a stripe written by the second write head and the first write head writes the base number of stripes in response to detecting the written stripe. The method precisely places stripe patterns used as timing-based servo patterns.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The embodiment of the present invention formats timing-based servo patterns by writing stripe patterns with a plurality of write elements. In addition, the present invention may improve the precision with precisely placed write elements. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Some of the functional units described in this specification have been labeled as modules, in order to more particularly emphasize on their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

References throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
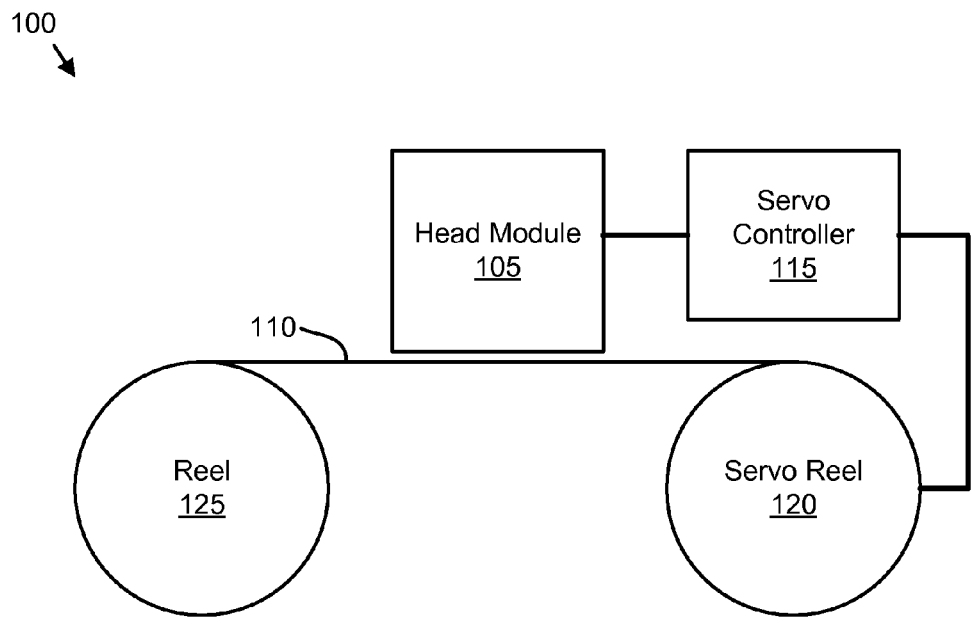
FIG. 1 is a schematic block diagram illustrating one embodiment of a magnetic tape system.

FIG. 1 depicts one embodiment of a magnetic tape system 100. The system 100 includes a magnetic tape 110 supported on a reel 125 and a servo reel 120, a head module 105, and a servo controller 115.

In one embodiment, the reel 125 is disposed within a tape cartridge (not shown). The servo reel 125 may motivate and/or transport the magnetic tape 110 from the reel 125, as well as hold the magnetic tape 110 after the magnetic tape 110 is transported from the tape cartridge. The servo reel 120 may include a servo motor configured to rotate the servo reel 120 as directed by the servo controller 115.

The head module 105 reads timing-based servo patterns from the magnetic tape 110. The head module 105 may include one or more read heads including servo read heads and one or more write heads including servo pattern write heads and data write heads. The head module 105 may include one or more servos that position the head module 105 latitudinally relative to the magnetic tape 110 in response to the timing-based servo patterns.

The timing-based servo patterns may be configured as a plurality of stripe patterns. Each stripe pattern may include one or more stripes. A stripe is a region of the magnetic tape 110 that is written to or magnetically polarized, as it is well known by those of skill in the art. Each stripe is slanted with one of one or more slant orientations.

The stripe patterns provide latitudinal and longitudinal position information. Each stripe is slanted so that oppositely slanted stripes may provide information about the latitudinal position of the head module 105.

In one embodiment, the servo controller 115 determines a latitudinal position of the head module 105 from timing differences between oppositely slanted stripes and positions the head module 105. For example, the servo controller 115 may position the head module 105 so that a read head is aligned with a track of the magnetic tape 110.

The longitudinal position information may be used to determine a magnetic tape position. For example, the head module 105 may determine an absolute longitudinal position on the magnetic tape 110 from the stripe patterns. Alternatively, the head module 105 may determine the velocity of the magnetic tape 110 from the stripe patterns by measuring the time difference between two "b" stripes a known distance apart.

In one embodiment, the servo controller 115 controls the transport of the magnetic tape 110 in response to the position and/or velocity information provided by the stripe patterns. For example, the servo controller 115 may direct the servo reel 120 to position the magnetic tape 110 to an absolute longitudinal position specified by the stripe patterns. Alternatively, the servo controller 115 may modify the velocity of the magnetic tape 110 as determined from the stripe patterns to match a specified velocity.

Figure 2:
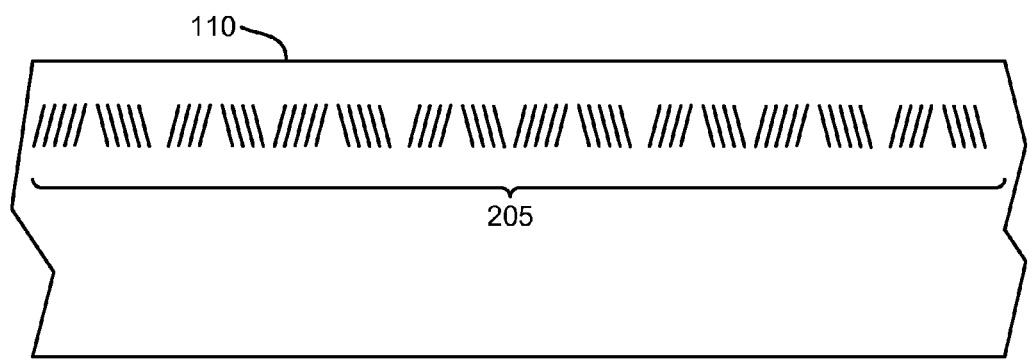
FIG. 2 is a schematic block diagram illustrating one embodiment of a magnetic tape with stripe pattern of the present invention.

FIG. 2 is a schematic block diagram illustrating one embodiment of a magnetic tape 110 with stripe pattern 205 of the present invention. The description of the magnetic tape 110 refers to elements of FIG. 1, like numbers referring to like elements. FIG. 2 shows the stripe pattern 205 written on the magnetic tape 110 of FIG. 1.

In the depicted embodiment, the stripe pattern 205 is a five (5) stripe, five (5) stripe, four (4) stripe, four (4) stripe pattern. One of skill in the art will appreciate that the stripe pattern 205 may include any combination of different numbers of stripes. For example, the stripe pattern 205 may be a six (6) stripe, five (5) stripe pattern. In one embodiment, the stripe pattern 205 is encoded with LPOS codes. The LPOS codes may encode numerical values within the stripes as is it well known to those of skill in the art.

The stripe pattern 205 is written by write elements. Unfortunately, if there are velocity variations while the stripe pattern 205 is written to the magnetic tape 110, the stripe pattern 205 will not precisely demark the longitudinal position of the magnetic tape 110. In addition, a precise magnetic tape velocity cannot be determined from the stripe pattern 205. A precise magnetic tape velocity is needed to accurately position the read/write head in the direction perpendicular to the tape movement direction. The present invention precisely writes timing-based servo patterns such as stripe patterns to the magnetic tape 110 so that the stripe patterns accurately demark latitudinal and longitudinal position on the magnetic tape 110.

Figure 3:
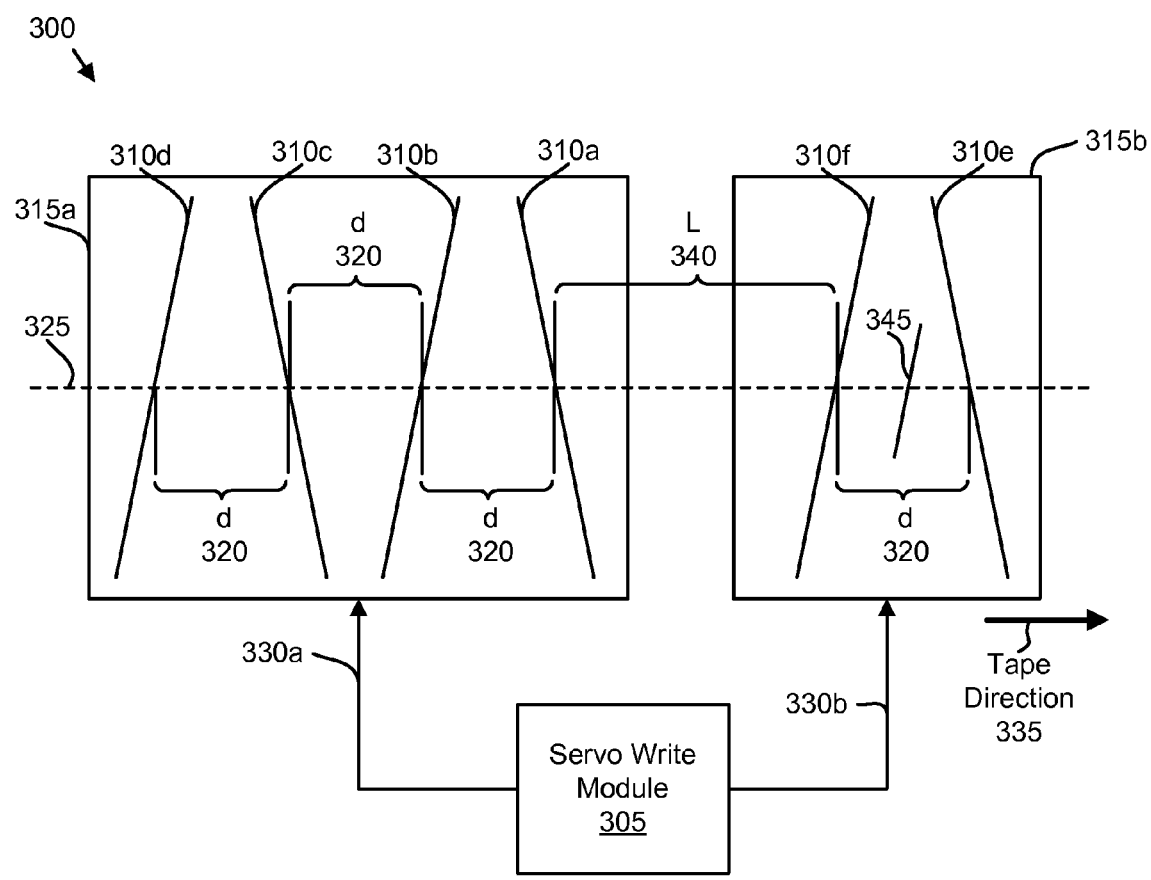
FIG. 3 is a schematic block diagram illustrating one embodiment of write heads in accordance with the present invention.

FIG. 3 is a schematic block diagram illustrating one embodiment of write heads 300 in accordance with the present invention. The description of the write heads 300 refers to elements of FIGS. 1 and 2, like numbers referring to like elements. The write heads 300 include a first write head 315*a* and a second write head 315*b* for writing the stripe pattern 205 on the magnetic tape 110.

The write heads 300 also include a servo write module 305. The first write head 315*a* is activated by a first write signal 330*a* from the servo write module 305. The second write head 315*b* is activated by a second write signal 330*b* from the servo write module 305. The first write head 315*a* comprises a single assembly with dimensions determined by lithography.

For example, the first write head 315a may be formed by a lithographic process that precisely places elements of the first write head 315a.

The second write head 315b is spaced at a distance 340 'L' from first write head 315a. The second write head 315b may also be lithographically formed so that the elements of second write head 315b are precisely placed. The elements of the write heads 300 may be lithographically formed to a specified tolerance of less than zero point zero one micrometers (0.01 µm). In certain embodiments, the tolerances of the elements of the write heads 300 may be in the range of zero point zero one to zero point one micrometers (0.01 to 0.1 µm). In certain embodiments, other fabrication techniques may be used to fabricate the elements of the write heads 300. The alignment tolerance of the second write head 315b relative to the first write head 315a is not as stringent as specified tolerance defined above. On receiving a first write signal 330a and/or second write signal 330b from the servo write module 305, the write heads 300 write a stripe pattern 205 on the magnetic tape 110 traveling in a direction 335.

The first write head 315a may comprise at least four write elements 310a, 310b, 310c, 310d. In one embodiment, the write elements 310 are spaced from each other at a distance 'd' 320. The distance 'd' 320 may be measured from the midpoint of the write element 310.

The write elements 310a-d concurrently write a base number of stripes to a first plurality of strip patterns on a magnetic tape 110 in response to the first write signal 330a. The first and the third write elements 310a, 310c of the first write head 315a concurrently write the base number of stripes to a plurality of first stripe patterns on the magnetic tape 110. In addition, the second and the fourth write elements 310b, 310d of the first write head 315a concurrently write the base number of stripes to a plurality of second stripe patterns.

The second write head 315b comprises fifth and sixth write elements 310e, 310f spaced at the distance 'd' 320. The fifth write element 310e writes an incremental number of stripes to a specified first stripe pattern to form a first incremental stripe pattern. The sixth write element 310f writes an incremental number of stripes to a specified second stripe pattern to form a second incremental stripe pattern.

In one embodiment, the second write head 315b comprises aread element 345 configured to detect a stripe written by the first write head 315a. The fifth and sixth write elements 310e, 310f may write the incremental number of stripes in response to detecting the written stripe. The read element 345 may be sensors such as, for example, lithographically fabricated read heads on the second write head 315b used to sense the exact position of the written stripe relative to the second write head 315b so that the second write head 315b may write the incremental stripes more accurately. One of skill in the art will recognize that the read element 345 may be fabricated anywhere on first and/or second write head 315b and is not limited to the position shown.

In one embodiment the distance 'd' 320 is approximately fifty micrometers (50 µm). The distance 'L' 340 may be greater than fifty micrometers (50 µm). The distance 'd' and the tape velocity determine the accuracy of the stripe pattern 205 written on the magnetic tape 110. The write elements 310 are substantially rectangular areas slanted at an angle to an axis perpendicular to the magnetic tape 110, the angle in the range of one to forty-five degrees (1-45°). Thus the stripes of the stripe pattern may be written as substantially rectangular areas slanted at an angle to an axis perpendicular to the magnetic tape 110 in the range of one to forty-five degrees (1-45°).

FIGS. 4A-4E are schematic drawings of one embodiment of stripe patterns 400 of the present invention. Each FIG. 4A-4E shows the stripe patterns 400 sequentially after each of a series of writes to the magnetic tape 110. The description of the FIGS. 4A-4E refers to elements of FIGS. 1-3, like numbers referring to like elements. This is a four (4), four (4), five (5), five (5) embodiment.

Figure 4A:
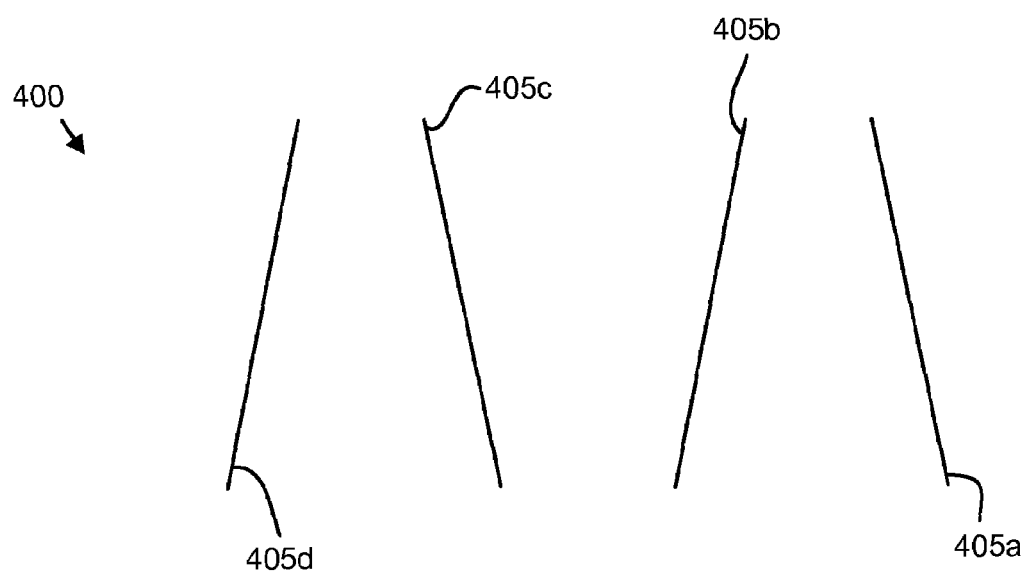
FIGS. 4A-4E are schematic drawings of one embodiment of stripe patterns of the present invention.
Figure 4B:
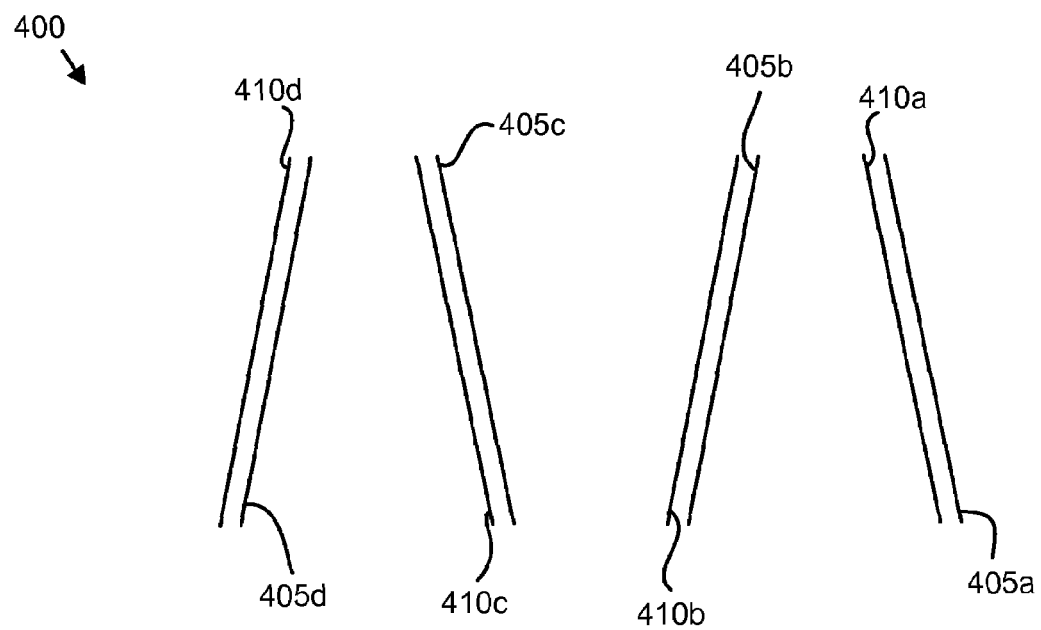

FIG. 4A shows first stripes 405a-405d of the stripe patterns 400 written by the first, second, third, and fourth write elements 310a-310d of the first write head 315a in response to a first write signal 330a from the servo write module 305. FIG. 4B shows stripe patterns 400 comprising second stripes 410a-410d written adjacent to the first stripes 405a-405d of FIG. 4A by the first, second, third, and fourth write elements 310a-310d of the first write head 315a in response to a subsequent first write signal 330a.

Figure 4C:
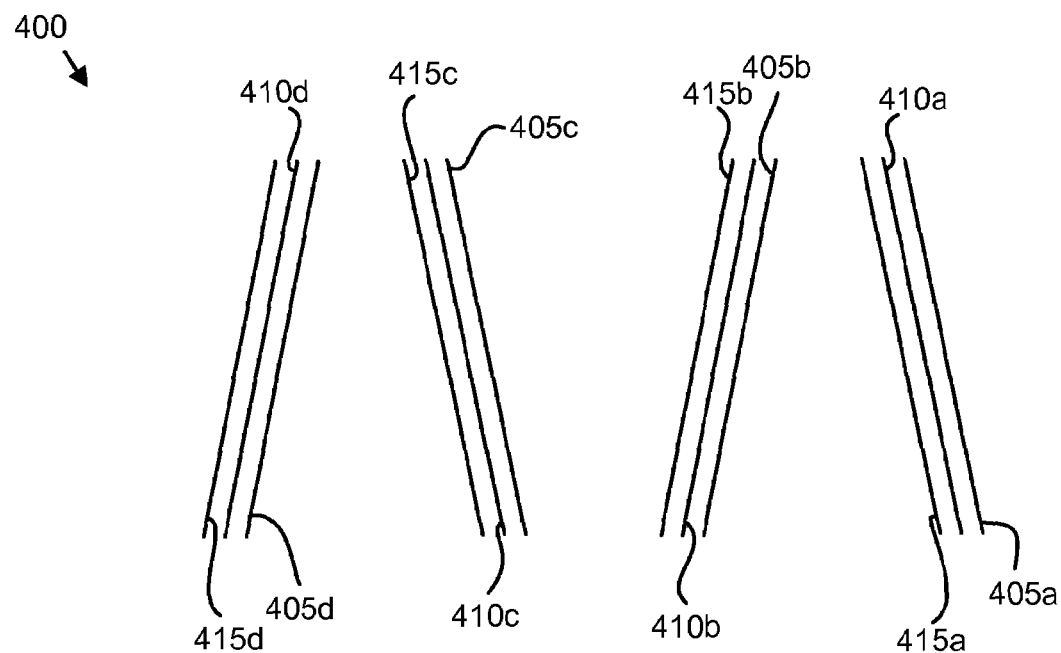
Figure 4D:
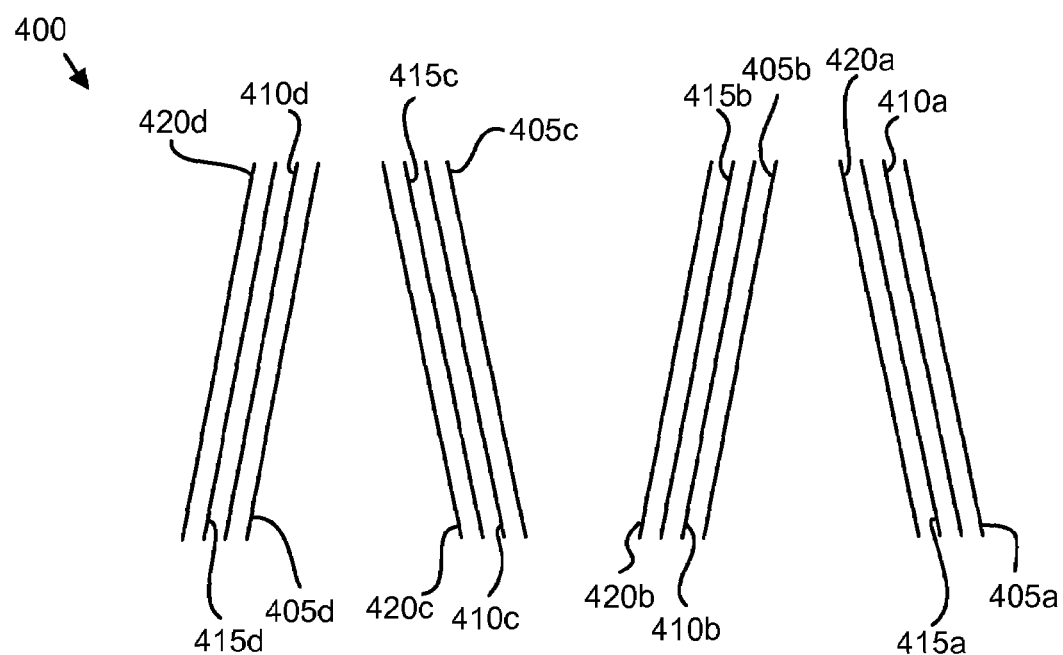
Figure 4E:
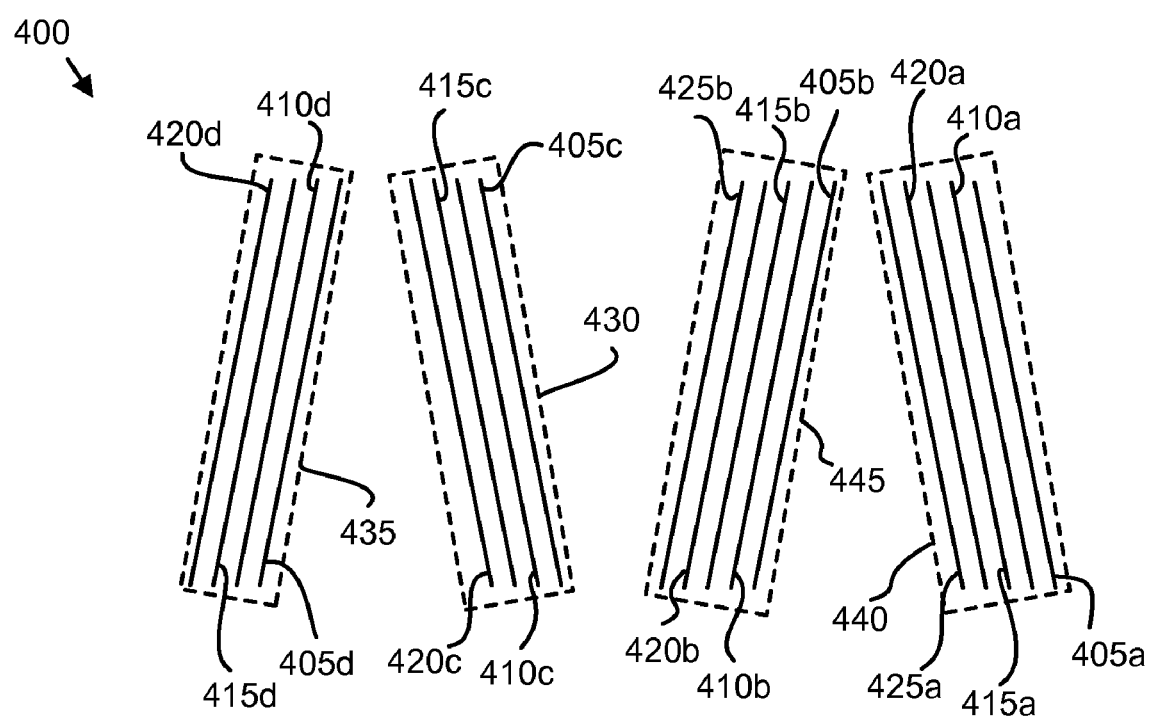

FIG. 4C shows third stripes 415a-415d written adjacent to the second stripes 410a-d of FIG. 4B by the first, second, third, and fourth write elements 310a-310d in response to a subsequent first write signal 330a. FIG. 4D shows fourth stripes 420a-420d written adjacent to the third stripes 415a-415d of FIG. 4C by the first, second, third, and fourth write elements 310a-310d in response to a subsequent first write signal 330a. The first, second, third, and fourth stripes 405, 410, 415, 420 form first stripe patterns 430 and second stripe patterns 435 as indicated by the hashed boxes. FIG. 4E shows incremental stripes 425a, 425b written by the fifth and sixth write elements 310e, 310f of the second write head 315b to form the first incremental and second incremental stripe pattern 440, 445 respectively as indicated by the hashed boxes.

As the magnetic tape 110 moves from left to right at a velocity such as one meter per second (1 m/s) across the write heads 300, in one embodiment the stripe patterns 400 shown in FIG. 4 are written on a five microsecond (5 µs) clock for each step. In one embodiment the first and second write heads 315a and 315b write a repeated sequence of the first stripe pattern 430, the second stripe pattern 435, the first incremental stripe pattern 440, and the second incremental stripe pattern 445.

The first and second stripe patterns 430, 435 and first incremental and second incremental stripe patterns 445, 440 may be encoded with longitudinal positioning servo (LPOS) codes. The first write signal 330a may be pulsed within point two five microseconds (0.25 µs) of the five microsecond (5 µs) clock to modify second and fourth stripes 410, 420 for LPOS coding.

Because the placement of the first, second, third, and fourth write elements 310a-3120d on the first write head 315a determines the relative positioning of the first stripes 405 and because the first, second, third, and fourth write elements 310a-310d are precisely placed by, for example, a lithographic process, the positioning of the first stripes 405 is precise. Similarly, the positioning of the second stripes 410 relative to each other, third stripes 415 relative to each other, fourth stripes 420 relative to each other, and the incremental stripes 425 relative to each other is precise. The increased precision may reduce errors and support increased magnetic tape velocities.

Figure 5:
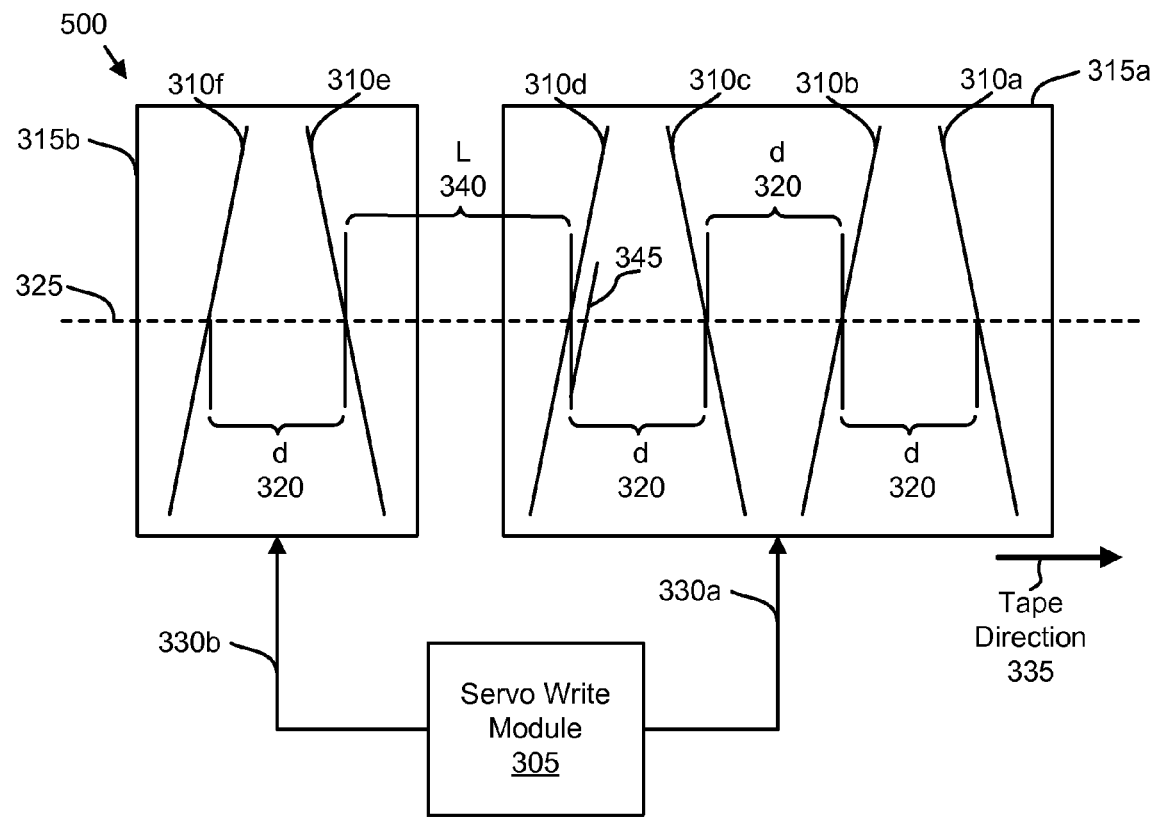
FIG. 5 is a schematic block diagram illustrating one alternate embodiment of write heads of the present invention.

FIG. 5 shows another embodiment of the write heads 500 in accordance with the present invention. The write heads 500 are configured for writing stripe patterns 205 such as the five (5), five (5), four (4), four (4) stripe pattern 400 of FIGS. 4A-4E. The description of the write heads 500 refers to elements of FIGS. 1-4, like numbers referring to like elements. The write heads 500 comprise the first write head 315a and the second write head 315b. The positions of first write head 315a and the second write head 315b shown in FIG. 5 are exchanged relative to FIG. 3.

In the depicted embodiment, the magnetic tape 110 initially passes over the second write head 315b and subsequently passes over the first write head 315a. The fifth and sixth write elements 310e, 310f write the incremental stripes 425a, 425b to the magnetic tape 110 in response to the second write signal 330b to begin two incremental stripe patterns 440, 445. The first, second, third, and fourth write elements 310a-d add the base number of stripes to the incremental stripes 425 to complete the two incremental stripe patterns 440, 445 and to form the first and second stripe patterns 430 and 435.

For example, the third and fourth write elements 310c, 310d may each add four base stripes to the incremental stripes 425a, 425b to form the first and second incremental stripe patterns 440, 445 while the first and second write elements 310a, 310b may write four base stripes to form the first and second stripe patterns 430, 435. The writing of stripe patterns 430, 435 and incremental stripe patterns 440, 445 with the write heads 500 is described in greater detail in FIGS. 6A-6E.

The first and second write signals 330a, 330b cause the write elements 310 to write stripes. In one embodiment, the first write head 315a includes the read element 345. The servo write module 305 may generate the first write signal 330a in response to the read element 345 reading a stripe written by the sixth write element 310f. By writing the stripes 405, 410, 415, 420 with the first, second, third, and fourth write elements 310a-310d in response to reading incremental stripe 425, the present invention positions the stripes 405, 410, 415, 420 precisely relative to the incremental stripes 425.

FIGS. 6A-6E are schematic drawings of another embodiment of stripe patterns 600 of the present invention. Each FIG. 6A-6E shows the stripe patterns 600 sequentially after each of a series of writes to the magnetic tape 110 by the write heads 500 of FIG. 5. The description of the stripe patterns 600 refers to elements of FIGS. 1-6, like numbers referring to like elements.

Figure 6A:
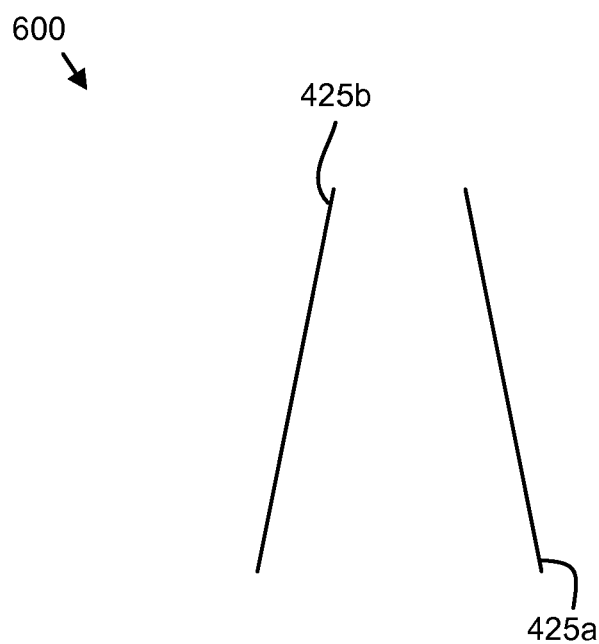
FIG. 6A-6E are schematic drawings of one alternate embodiment of stripe patterns of the present invention.
Figure 6B:
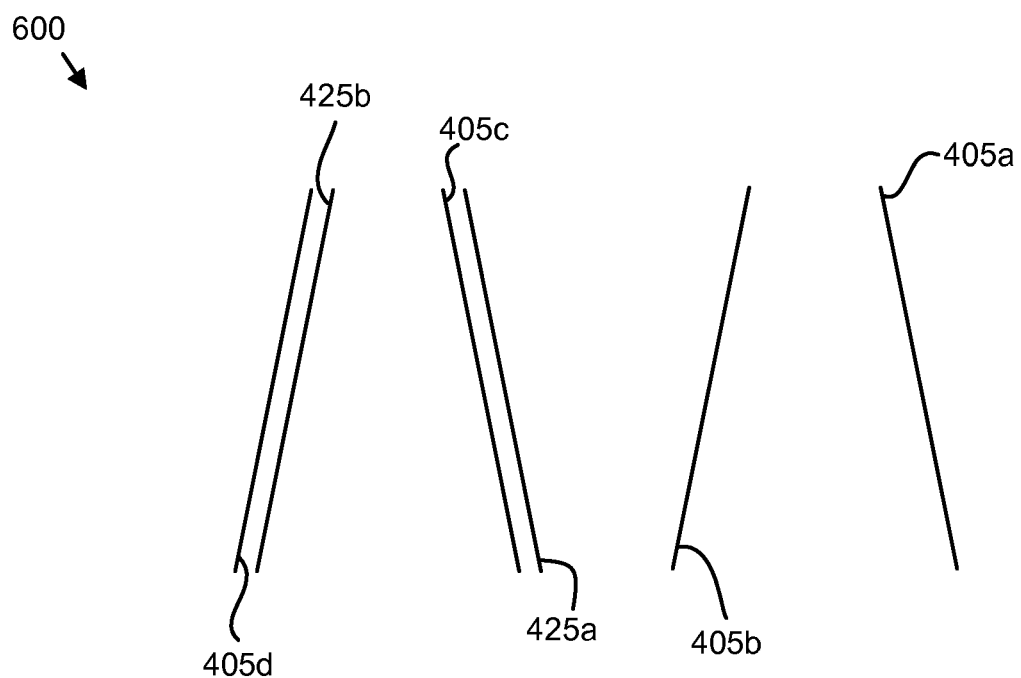

FIG. 6A shows incremental stripes 425a, 425b of the stripe patterns 600 written by the fifth and sixth write elements 310e, 310f of the second write head 315b in response to the second write signal 330b. FIG. 6B shows stripe patterns 600 comprising the first stripes 405a-405d of the stripe patterns 600 written by the first, second, third, and fourth write elements 310a-310d of the first write head 315a in response to a first write signal 330a from the servo write module 305. The stripes 405a-405d written by the first, second, third, and fourth write elements 310a-310d are written adjacent to the incremental stripes 425a, 425b of FIG. 6A.

Figure 6C:
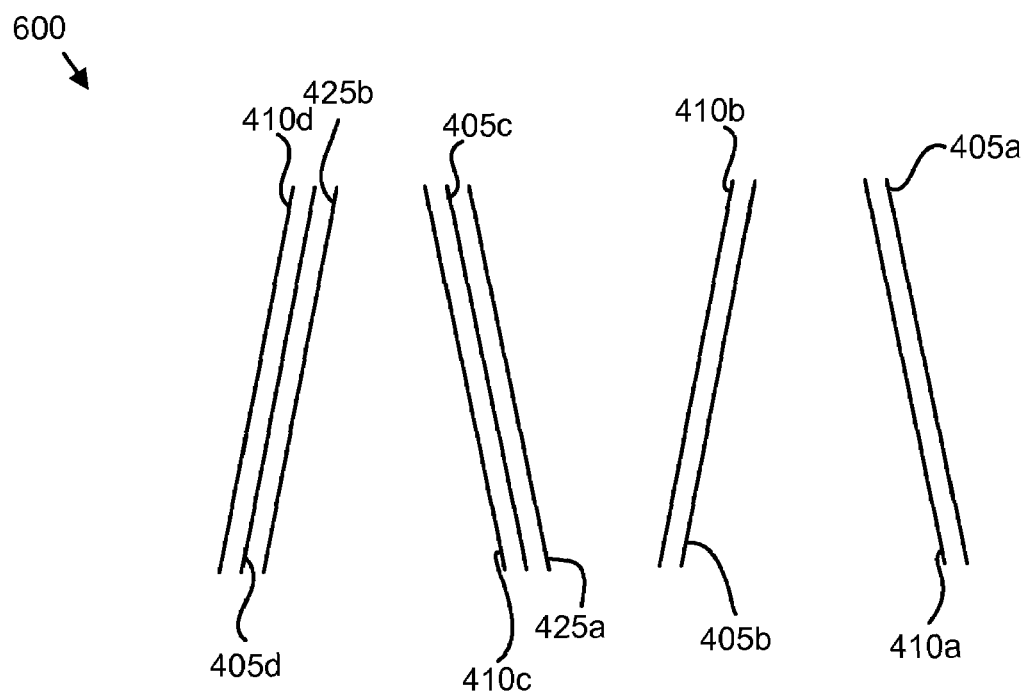
Figure 6D:
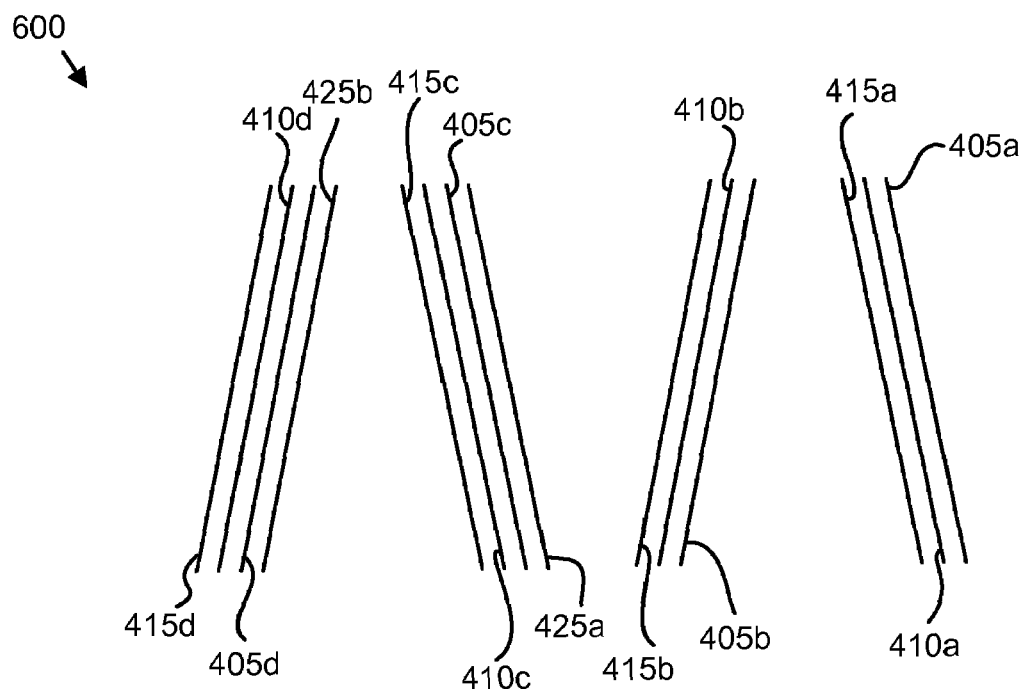
Figure 6E:
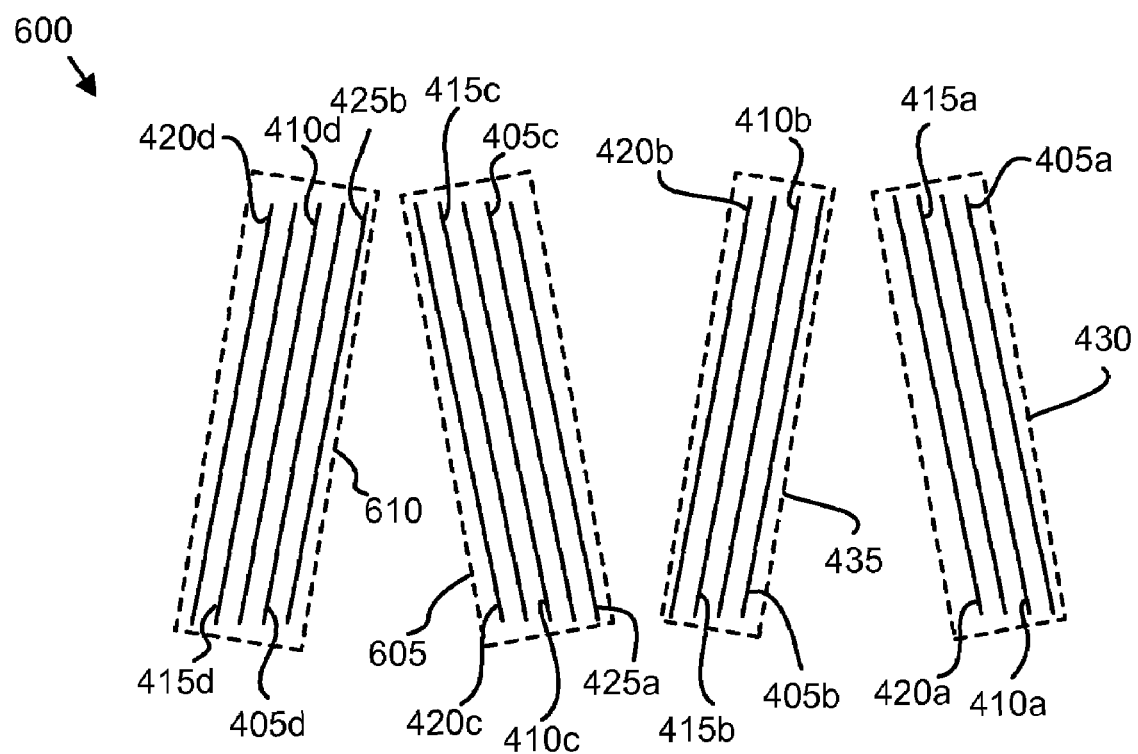

FIG. 6C shows second stripes 410a-410d written adjacent to the first stripes 405a-405d of FIG. 6B by the first, second, third, and fourth write elements 310a-310d in response to a subsequent first write signal 330a. FIG. 6D shows third stripes 415a, 415b written adjacent to the second stripes 410a, 410b of FIG. 6C by the first, second, third, and fourth write elements 310a-310d in response to a subsequent first write signal 330a. FIG. 6E shows fourth stripes 420a-d written adjacent to the third stripes 415a-415d of FIG. 6D by the first, second, third, fourth write elements 310a-310d of the first write head 315a to form the first incremental and second incremental stripe pattern 605, 610 (you also use the names "first incremental and second incremental stripe patterns" for 445, 440) respectively as indicated by the hashed boxes. The first, second, third, and fourth stripes 405, 410, 415, 420 also form the first stripe pattern 430 and the second stripe pattern 435.

The first and second stripe patterns 430, 435 and first incremental and second incremental stripe patterns 605, 610 may be encoded with LPOS codes. For example, the first write signal 330a may be pulsed within zero point two five microseconds (0.25 μs) of the five microsecond (5 μs) clock to modify first and third stripes 405, 415 for LPOS coding.

Figure 7:
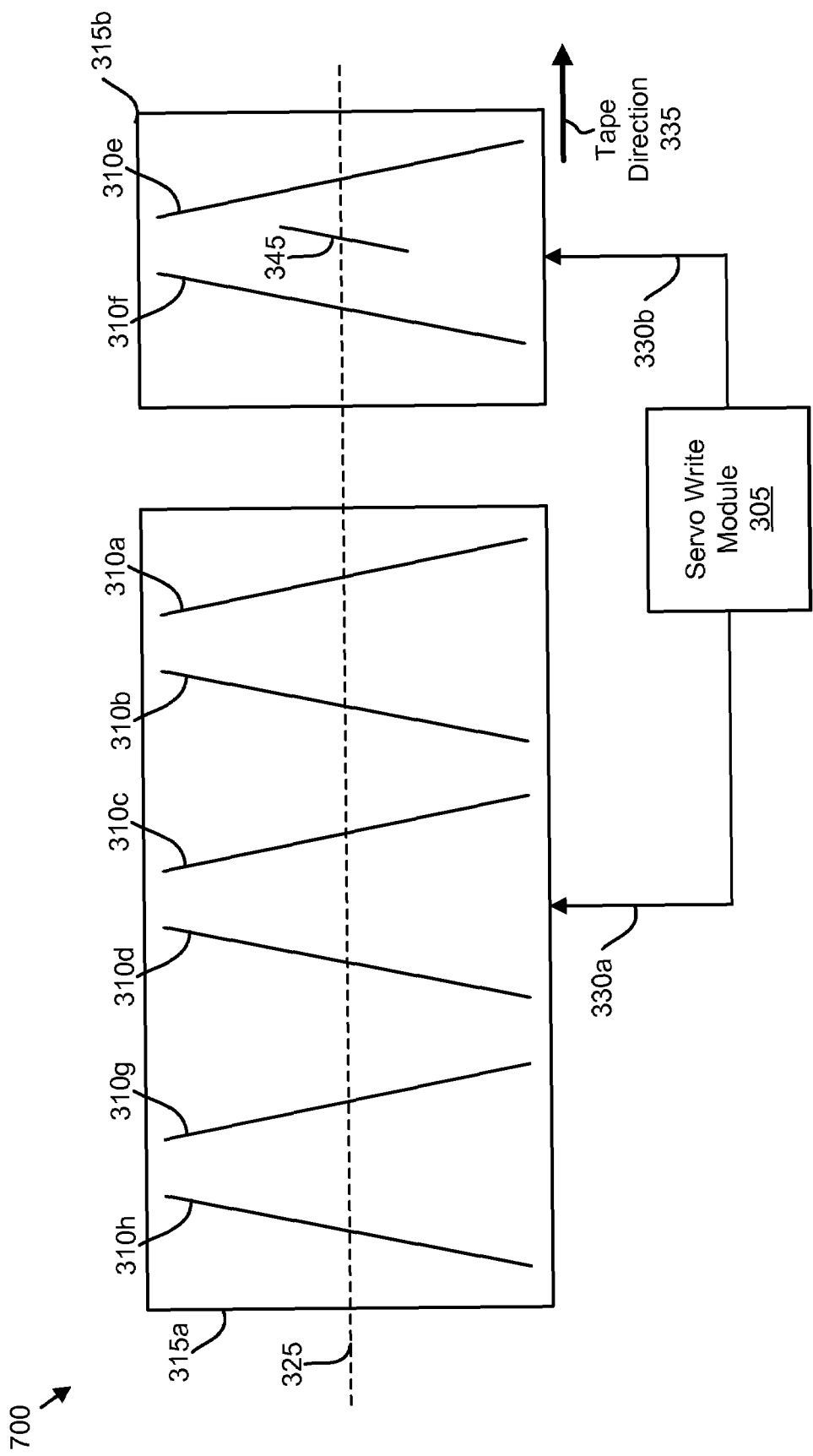
FIG. 7 is a schematic block diagram illustrating an alternate embodiment of write heads of the present invention.

FIG. 7 shows an alternate embodiment of the write heads 700 of the present invention. The write heads 700 include a first write head 315a and a second write head 315b activated by the first write signal 330a and the second write signal 330b from the servo write module 305. The description of the write heads 700 refers to elements of FIGS. 1-6, like numbers referring to like elements.

The first write head 315a includes six write elements 310a-310d, 310g, 310h. The second write head 315b includes two write elements 310e, 310f as described in FIGS. 3 and 5. In addition, the second write head 315b may comprise a read element 345 configured to detect a stripe written by the first write head 315a.

The first write head 315a may write a base number of stripes for six stripe patterns 430, 435. In one embodiment, the base number of stripes is three stripes. The second write head 315b may add two incremental stripes to two of the stripe patterns, forming incremental stripe patterns 440, 445. Thus the write heads 700 may form a stripe pattern 205 of three (3), three (3), three (3), three (3), three (3), three (3), five (5), and five (5) stripes. One of skill in the art will recognize that the present invention may be used to precisely write stripe patterns 205 with a plurality of configurations as base stripes, incremental stripes, and numbers and orders of stripe patterns and incremental stripe patterns.

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 8:
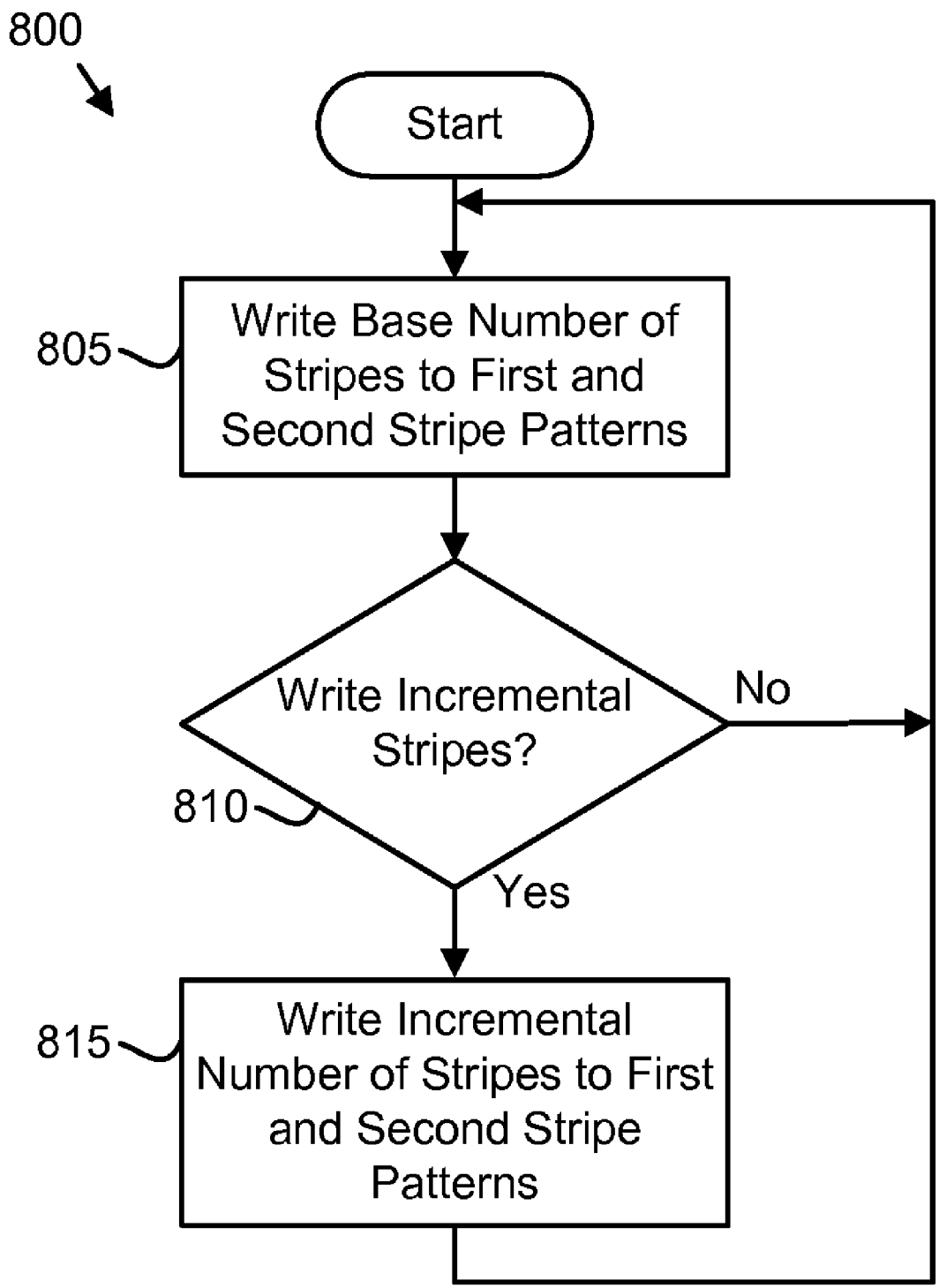
FIG. 8 is a schematic flow chart diagram illustrating one embodiment of a servo pattern method of the present invention.

FIG. 8 is a schematic flow chart diagram illustrating one embodiment of a servo pattern method 800 in accordance with the present invention. The method 800 substantially includes the steps to carry out the functions presented above with respect to the operation of the described apparatus and system of FIGS. 1-7.

The method 800 begins, and the first write head 315a concurrently writes 805 a base number of stripes to a plurality of first stripe patterns 430 with the first and third element 310a and 310c and writes the base number of stripes to a plurality of second stripe patterns 435 with the second and fourth element 310b and 310d of the first write head 315a in response to at least one first write signal 330a. The base number of stripes may be any number of stripes. In one embodiment, the base number is in the range of two to six (2-6) stripes.

In one embodiment, the servo write module 305 determines 810 whether the magnetic tape 110 is in a position where incremental stripes 425 can be written on the tape 110. In a certain embodiment, the servo write module 305 determines 810 to write incremental stripes in response to the read element 345 disposed on the second write head 315*b* detecting a stripe written by the first write head 315*a*

If the magnetic tape 110 is in a position where incremental stripes 425 may be written, then the second write head 315*b* concurrently writes 815 an incremental number of stripes to a specified first stripe pattern 430 to form a first incremental stripe pattern 440 with a fifth write element 310*e* of the second write head 315*b* and writes the incremental number of stripes to a specified second stripe pattern 435 to form a second incremental stripe pattern 445 with a sixth write element 310*f*. The incremental number of stripes may be any number of stripes. In a certain embodiment, the incremental number of stripes is in the range of one to two (1-2) stripes.

In one embodiment, if the magnetic tape 110 is not in a position where incremental stripes 425 may be written, the method 800 loops to the first write head 315*a* concurrently writes 805 the base number of stripes. The method 800 precisely places stripe patterns used as timing-based servo patterns.

The embodiment of the present invention formats timing-based servo patterns by writing stripe patterns 205 with a plurality of write elements 310. In addition, the present invention may improve the precision with precisely placed write elements 310. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to format a timing-based servo pattern, the apparatus comprising:
   a first write head comprising at least four write elements configured to each concurrently write a stripe to a magnetic tape, wherein in response to at least one first write signal a first and third write element write a base number of stripes to a plurality of first stripe patterns, a second and fourth write element write the base number of stripes to a plurality of second stripe patterns; and
   a second write head comprising a read element configured to detect a stripe written by the first write head and at least two write elements configured to each concurrently write a stripe to the magnetic tape, wherein in response to detecting the written stripe a fifth write element writes an incremental number of stripes to a specified first stripe pattern of the plurality of stripe patterns to form a first incremental stripe pattern and a sixth write element writes the incremental number of stripes to a specified second stripe pattern of the plurality of second stripe patterns to form a second incremental stripe pattern.

2. The apparatus of claim 1, the first write head further comprising a read element configured to detect a stripe written by the second write head and wherein the first write head writes the base number of stripes in response to detecting the written stripe.

3. The apparatus of claim 1, wherein the first and second write heads write a repeated sequence of the first stripe pattern, the second stripe pattern, the first incremental stripe pattern, and the second incremental stripe pattern.

4. The apparatus of claim 3, wherein the base number is four stripes and the incremental number is one stripe.

5. The apparatus of claim 1, wherein the write elements of the first write head are lithographically formed to a specified tolerance.

6. The apparatus of claim 5, wherein the specified tolerance is in the range of 0.01 to 0.1 micrometers.

7. The apparatus of claim 1, wherein the first and second stripe patterns, the first incremental stripe pattern and the second incremental stripe pattern are encoded with longitudinal positioning servo codes.

8. The apparatus of claim 1, wherein each stripe is configured as a substantially rectangular area slanted at an angle to an axis perpendicular to the magnetic tape, the angle in the range of one to forty five degrees.

9. A method for formatting a timing-based servo pattern, the method comprising:
   concurrently writing a base number of stripes to a plurality of first stripe patterns with a first and third write element of a first write head and writing the base number of stripes to a plurality of second stripe patterns with a second and fourth write element of the first write head, the first write head comprises at least four write elements, and the first write head writes stripes in response to at least one first write signal;
   detecting a stripe written by the first write head with a read element; and
   concurrently writing an incremental number of stripes to a specified first stripe pattern of the plurality of first stripe patterns with a fifth write element of a second write head to form a first incremental stripe pattern and writing the incremental number of stripes to a specified second stripe pattern of the plurality of second stripe patterns with a sixth write element of the second write head to form a second incremental stripe pattern, wherein the second write head writes stripes in response to detecting the written stripe.

10. The method of claim 9, the method further comprising detecting a stripe written by the second write head and wherein the first write head writes the base number of stripes in response to detecting the written stripe.

11. The method of claim 9, the method further comprising writing a repeated sequence of the first stripe pattern, the second stripe pattern, the first incremental stripe pattern, and the second incremental stripe pattern.

12. The method of claim 11, wherein the base number is four stripes and the incremental number is one stripe.

13. A system to format a timing-based servo pattern, the system comprising:
   a magnetic tape configured to store digital data;
   a servo write module configured to generate a plurality of first and second write signals;
   a first write head comprising at least four write elements configured to each concurrently write a stripe to the magnetic tape, wherein in response to at least one first write signal a first and third write element write a base number of stripes to a plurality of first stripe patterns, a second and fourth write element element write the base number of stripes to a plurality of second stripe patterns; and
   a second write head comprising a read element configured to detect a stripe written by the first write head and at least two write elements configured to each concurrently write a stripe to the magnetic tape, wherein in response to detecting the written stripe a fifth write element writes an incremental number of stripes to a specified first stripe pattern of the plurality of stripe patterns to form a first incremental stripe pattern and a sixth write element writes the incremental number of stripes to a specified second stripe pattern of the plurality of second stripe patterns to form a second incremental stripe pattern.

14. The system of claim 13, the first write head further comprising a read element configured to detect a stripe written by the second write head and wherein the first write head writes the base number of stripes in response to detecting the written stripe.

15. The system of claim 13, wherein the first and second write heads write a repeated sequence of the first stripe pattern and the second stripe pattern.

16. The system of claim 15, wherein the base number is four stripes and the incremental number is one stripe.

17. An apparatus to format a timing-based servo pattern, the apparatus comprising:

means for concurrently writing a base number of stripes to a plurality of first stripe patterns with a first and third write element and writing the base number of stripes to a plurality of second stripe patterns with a second and fourth write element, the base stripe writing means comprises at least four write elements, and the base stripe writing means writes stripes in response to at least one first write signal;

means for concurrently writing an incremental number of stripes to a specified first stripe pattern of the plurality of first stripe patterns with a fifth write element to form a first incremental stripe pattern and writing the incremental number of stripes to a specified second stripe pattern of the plurality of second stripe patterns with a sixth write element to form a second incremental stripe pattern, wherein the incremental stripe writing means writes stripes in response to at least one second write signal; and means for detecting a stripe written by the first write head with a read element and wherein the incremental stripe writing means writes the incremental number of stripes in response to detecting the written stripe.

* * * * *